United States Patent
Choi et al.

(10) Patent No.: US 12,450,181 B2
(45) Date of Patent: Oct. 21, 2025

(54) MEMORY CONTROLLER, STORAGE DEVICE, AND METHOD OF OPERATING THE SAME

(71) Applicant: SK hynix Inc., Gyeonggi-do (KR)

(72) Inventors: Ji Hun Choi, Gyeonggi-do (KR); Jeong Hyun Kim, Gyeonggi-do (KR); Min Su Son, Gyeonggi-do (KR); Sung Ju Yoo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 332 days.

(21) Appl. No.: 18/107,008

(22) Filed: Feb. 8, 2023

(65) Prior Publication Data
US 2024/0004811 A1 Jan. 4, 2024

(30) Foreign Application Priority Data
Jul. 4, 2022 (KR) .................. 10-2022-0082036

(51) Int. Cl.
*G06F 13/16* (2006.01)
*G06F 12/02* (2006.01)
*G06F 13/18* (2006.01)

(52) U.S. Cl.
CPC ...... *G06F 13/1673* (2013.01); *G06F 12/0238* (2013.01); *G06F 13/18* (2013.01); *G06F 2212/7201* (2013.01)

(58) Field of Classification Search
CPC .. G06F 13/1673; G06F 13/18; G06F 12/0246; G06F 12/0623; G06F 12/1009; G06F 2212/7201; G06F 2212/1216; G06F 3/0611; G06F 3/0659; G06F 3/0604; G06F 3/061; G06F 3/064; G06F 3/0656; G06F 3/0658
See application file for complete search history.

(56) References Cited

U.S. PATENT DOCUMENTS

| | | | | |
|---|---|---|---|---|
| 5,956,039 | A * | 9/1999 | Woods | H04L 9/40 345/419 |
| 11,966,329 | B2 * | 4/2024 | Frolikov | G06F 12/0802 |
| 2007/0022250 | A1 * | 1/2007 | Fields | G06F 12/0893 711/E12.075 |
| 2015/0356118 | A1 * | 12/2015 | Kalai | G01C 21/367 345/520 |
| 2016/0196208 | A1 * | 7/2016 | Choi | G06F 12/0646 711/171 |
| 2017/0083592 | A1 * | 3/2017 | Govindappanavar | G06F 16/284 |
| 2019/0012271 | A1 * | 1/2019 | Avoinne | G06F 12/145 |

(Continued)

FOREIGN PATENT DOCUMENTS

| | | |
|---|---|---|
| KR | 10-2014-0006299 A | 1/2014 |
| KR | 10-2020-0050169 A | 5/2020 |
| KR | 10-2021-0068699 A | 6/2021 |

*Primary Examiner* — Hiep T Nguyen
(74) *Attorney, Agent, or Firm* — IP & T GROUP LLP

(57) ABSTRACT

A storage device of the present disclosure includes a memory device configured to store a plurality of address maps indicating a mapping relationship between a logical address and a physical address, and a memory controller configured to, when the storage device is in a power on state from a power off state, determine a priority rank of each of the plurality of address maps based on file attribute information received from a host and sequentially load the plurality of address maps according to the priority rank.

18 Claims, 13 Drawing Sheets

| ADDRESS GROUP | FILE | ACCESS FREQUENCY | RECENT ACCESS TIME | PRIORITY WEIGHTED VALUE | PRIORITY SCORE |
|---|---|---|---|---|---|
| LBAG1 | F1 | FA1 | TA1 | $PV1 = m1 \times (FA1) + m2 \times (CURRENT\ TIME - TA1)$ | |
| LBAG1 | F2 | FA2 | TA2 | $PV2 = m1 \times (FA2) + m2 \times (CURRENT\ TIME - TA2)$ | $PS1 = (PV1+PV2+PV3+PV4)/4$ |
| LBAG1 | F3 | FA3 | TA3 | $PV3 = m1 \times (FA3) + m2 \times (CURRENT\ TIME - TA3)$ | |
| LBAG1 | F4 | FA4 | TA4 | $PV4 = m1 \times (FA4) + m2 \times (CURRENT\ TIME - TA4)$ | |

610

PRIORITY WEIGHTED VALUE = m1 × (ACCESS FREQUENCY) + m2 × (CURRENT TIME − RECENT ACCESS TIME) — 620

PRIORITY SCORE = AVERAGE VALUE OF PRIORITY WEIGHTED VALUES — 630

(56) References Cited

U.S. PATENT DOCUMENTS

2020/0183856 A1\* 6/2020 Campbell ............. G06F 12/124
2021/0182214 A1\* 6/2021 Moyer ................. G06F 12/122

\* cited by examiner

FIG. 3

BLK1

| | |
|---|---|
| PG1 | F1 |
| PG2 | F1 |
| PG3 | F1 |
| PG4 | F2 |
| PG5 | F2 |
| PG6 | F3 |
| PG7 | F3 |
| PG8 | F3 |
| PG9 | F3 |
| ⋮ | |

| ADDRESS GROUP | FILE | ADDRESS INFORMATION | | ACCESS INFORMATION | | FILE TIME INFORMATION | |
|---|---|---|---|---|---|---|---|
| | | START LOGICAL ADDRESS | LENGTH | ACCESS FREQUENCY | RECENT ACCESS TIME | FILE CREATION TIME | FILE MODIFICATION TIME |
| LBAG1 | F1 | LBAa | L1 | FA1 | TA1 | TG1 | TE1 |
| LBAG1 | F2 | LBAb | L2 | FA2 | TA2 | TG2 | TE2 |
| LBAG1 | F3 | LBAc | L3 | FA3 | TA3 | TG3 | TE3 |
| LBAG1 | F4 | LBAd | L4 | FA4 | TA4 | TG4 | TE4 |
| LBAG2 | F5 | LBAe | L5 | FA5 | TA5 | TG5 | TE5 |
| ... | ... | ... | ... | ... | ... | ... | ... |

FIG. 6

| ADDRESS GROUP | FILE | ACCESS FREQUENCY | RECENT ACCESS TIME | PRIORITY WEIGHTED VALUE | PRIORITY SCORE |
|---|---|---|---|---|---|
| LBAG1 | F1 | FA1 | TA1 | $PV1 = m1 \times (FA1) + m2 \times (\text{CURRENT TIME} - TA1)$ | $PS1 = (PV1+PV2+PV3+PV4)/4$ |
| LBAG1 | F2 | FA2 | TA2 | $PV2 = m1 \times (FA2) + m2 \times (\text{CURRENT TIME} - TA2)$ | |
| LBAG1 | F3 | FA3 | TA3 | $PV3 = m1 \times (FA3) + m2 \times (\text{CURRENT TIME} - TA3)$ | |
| LBAG1 | F4 | FA4 | TA4 | $PV4 = m1 \times (FA4) + m2 \times (\text{CURRENT TIME} - TA4)$ | |

PRIORITY WEIGHTED VALUE = m1 × (ACCESS FREQUENCY) + m2 × (CURRENT TIME − RECENT ACCESS TIME)

PRIORITY SCORE = AVERAGE VALUE OF PRIORITY WEIGHTED VALUES

FIG. 8

| FILE | FILE CREATION TIME | FILE MODIFICATION TIME | HOT/COLD WEIGHTED VALUE |
|---|---|---|---|
| F1 | TG1 | TE1 | HCV1 = h1 × (TE1−TG1) + h2 × (CURRENT TIME − TE1) |
| F2 | TG2 | TE2 | HCV2 = h1 × (TE2−TG2) + h2 × (CURRENT TIME − TE2) |
| F3 | TG3 | TE3 | HCV3 = h1 × (TE3−TG3) + h2 × (CURRENT TIME − TE3) |
| F4 | TG4 | TE4 | HCV4 = h1 × (TE4−TG4) + h2 × (CURRENT TIME − TE4) |

810

HOT/COLD WEIGHTED VALUE = h1 × (FILE MODIFICATION TIME − FILE CREATION TIME) + h2 × (CURRENT TIME − FILE MODIFICATION TIME) — 820

FIG. 9

| FILE | HOT/COLD WEIGHTED VALUE | HOT/COLD RANK |
|---|---|---|
| F1 | HCV1 | 4 |
| F2 | HCV2 | 1 |
| F3 | HCV3 | 3 |
| F4 | HCV4 | 2 |
| ... | ... | ... |

(HCV2 > HCV4 > HCV3 > HCV1)

MEMORY CONTROLLER, STORAGE DEVICE, AND METHOD OF OPERATING THE SAME

CROSS-REFERENCE TO RELATED APPLICATION

The present application claims priority under 35 U.S.C. § 119 (a) to Korean patent application number 10-2022-0082036, filed on Jul. 4, 2022, the entire disclosure of which is incorporated herein by reference.

BACKGROUND

1. Field of Invention

The present disclosure relates to an electronic device, and more particularly, to a memory controller, a storage device, and a method of operating the same.

2. Description of Related Art

A storage device is a device that stores data under control of a host such as a computer or a smart phone. The storage device includes a memory device in which data is stored and a memory controller that controls the memory device. The memory device is classified into a volatile memory device and a non-volatile memory device.

When a request of the host is received, the storage device may load an address map in advance to quickly process the request of the host. The address map is data used to convert a logical address provided by the host into a physical address of the memory device.

Moreover, as a data storage capacity of the memory device increases, a capacity of the address map also increases. Accordingly, a lot of time is required for the storage device to load the address map. At this time, when the request of the host is received, there is an issue in which additional overhead occurs and thus latency increases.

SUMMARY

An embodiment of the present disclosure provides a memory controller, a storage device, and a method of operating the same for improving an operation speed.

According to an embodiment of the present disclosure, a storage device may include a memory device configured to store a plurality of address maps indicating a mapping relationship between a logical address and a physical address, and a memory controller configured to, when the storage device is in a power on state from a power off state, determine a priority rank of each of the plurality of address maps based on file attribute information received from a host, and sequentially load the plurality of address maps according to the priority rank.

According to an embodiment of the present disclosure, a memory controller may include a host interface configured to receive, from a host, file attribute information for each of files included in a plurality of address groups when a storage device is in a power on state from a power off state, a memory interface configured to communicate with a memory device that stores a plurality of address maps indicating a mapping relationship between a logical address and a physical address, and a processor configured to determine a priority rank of each of the plurality of address maps corresponding to the plurality of address groups based on the file attribute information, and control the memory interface to sequentially load the plurality of address maps from the memory device according to the priority rank.

According to an embodiment of the present disclosure, a method of operating a storage device may include receiving, from a host when the storage device is in a power on state, file attribute information for each of files included in a plurality of address groups, determining a priority rank for a plurality of address maps corresponding to the plurality of address groups based on the file attribute information, and sequentially loading the plurality of address maps from a memory device according to the priority rank.

According to an embodiment of the present disclosure, a memory controller, a storage device, and a method of operating the same for improving an operation speed may be provided. According to an embodiment of the present disclosure, an operation speed of a booting process may be improved, and a memory block may be efficiently managed in consideration of an attribute of data and a lifetime of the memory block.

According to an embodiment of the present disclosure, an operating method of a controller may include receiving, from a host, attribute information of files corresponding to respective groups of logical addresses when powered on, the groups corresponding to respective address maps each representing relationships between logical and physical addresses indicating storage regions within a memory device storing therein the files, sequentially loading, based on the attribute information, the individual address maps onto an operating memory from the memory device, and controlling, in response to a request provided together with a logical address from the host during the sequential loading, the memory device to perform an operation by referring to the so-far loaded address maps for the provided logical address. The attribute information may represent an access frequency and a recent access time for a corresponding one of the files.

BRIEF DESCRIPTION OF THE DRAWINGS

FIG. 3 is a diagram illustrating a first memory block according to an embodiment of the present disclosure.

FIG. 5 is a diagram illustrating file attribute information according to an embodiment of the present disclosure.

FIG. 6 is a diagram illustrating a method of determining a priority score according to an embodiment of the present disclosure.

FIG. 8 is a diagram illustrating a method of determining a hot/cold weighted value according to an embodiment of the present disclosure.

FIG. 9 is a diagram illustrating a method of determining a hot/cold rank according to an embodiment of the present disclosure.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
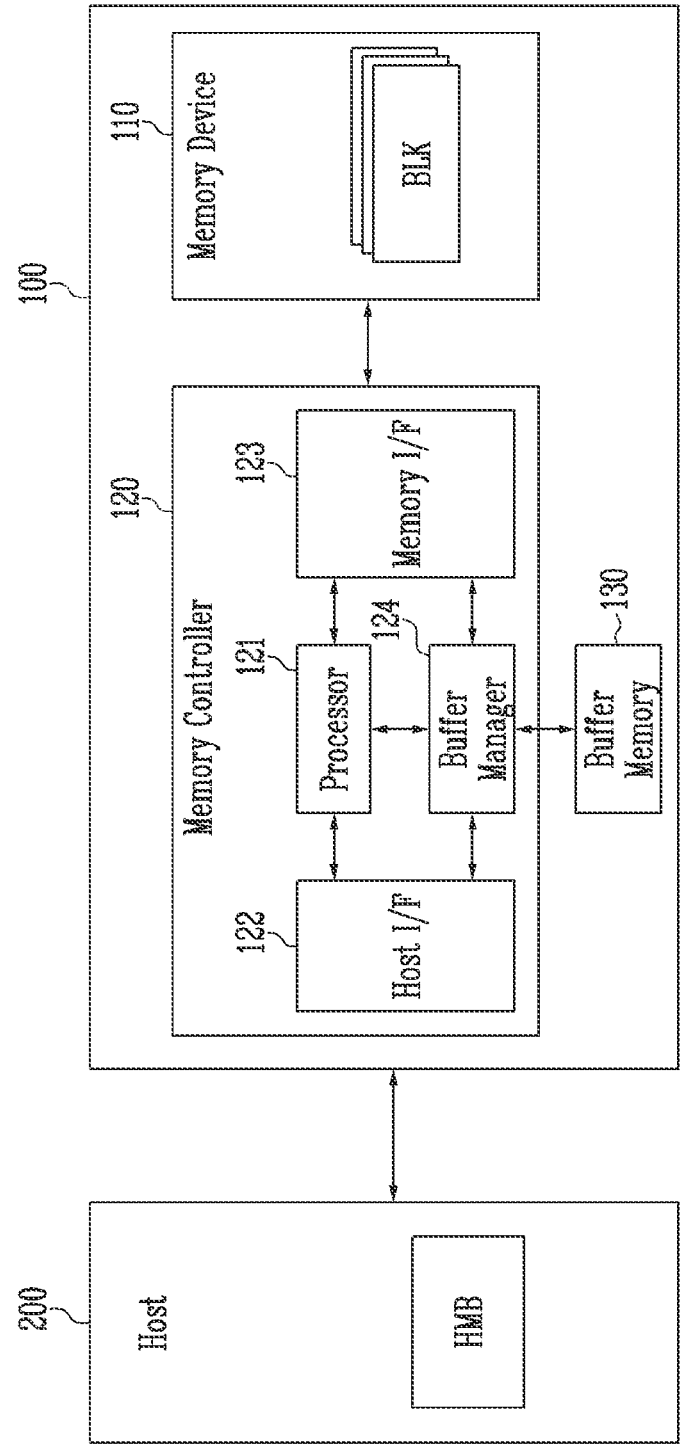
FIG. 1 is a diagram illustrating a storage device according to an embodiment of the present disclosure.

FIG. 1 is a diagram illustrating a storage device according to an embodiment of the present disclosure.

Referring to FIG. 1, the storage device 100 may store data. The storage device 100 may be implemented as any of various types of storage devices according to a communication standard or a method of storing data. For example, the storage device 100 may be implemented as any of a storage device of a type of a solid state disk (SSD), a multi-media card (MMC), an embedded MMC (eMMC), a reduced-size MMC (RS-MMC), and a micro-MMC, a storage device of a type of a secure digital (SD), a mini-SD, and a micro-SD, a universal serial bus (USB) storage device, a universal flash storage (UFS) device, a storage device of a personal computer memory card international association (PCMCIA) type, a storage device of a peripheral component interconnection (PCI) type, a storage device of a PCI express (PCI-E) type, a network attached storage (NAS), and a wireless network storage device. Here, the enumerated storage devices are merely examples, and the present disclosure is not limited thereto, and the storage device 100 may be implemented as various storage devices.

The storage device 100 may operate in response to a request of a host 200. Specifically, the storage device 100 may perform an operation corresponding to the request received from the host 200. For example, when data and a request for instructing to store the data are received from the host 200, the storage device 100 may store data in the storage device 100. As another example, when a request for instructing to read data is received from the host 200, the storage device 100 may provide the data stored in the storage device 100 to the host 200.

The host 200 may be one of various electronic devices such as a desktop computer, a laptop computer, a mobile phone, a smart phone, a game machine, a television (TV), a tablet computer, or a wearable device. The host 200 may request the storage device 100 to store data, read data, or erase data through communication using various communication standards. The storage device 100 may be mounted inside the host 200 or implemented as an external electronic device of the host 200.

The storage device 100 may include a memory device 110 and a memory controller 120. The storage device 100 according to an embodiment may further include a buffer memory 130.

The memory device 110 may store data. To this end, the memory device 110 may be implemented as various types of nonvolatile semiconductor memory devices. For example, the memory device 110 may be implemented as one of a NAND flash memory, a vertical NAND flash memory, a NOR flash memory, and the like.

The memory device 110 may include a plurality of memory blocks BLK. The plurality of memory blocks BLK may store at least one file. A file may indicate a unit of data.

Each memory block BLK may include a plurality of pages. The memory block BLK and the page may indicate a unit in which an operation related to data is performed. Each of the plurality of memory blocks BLK may be one of a user data block storing user data and a system data block storing system data. The system data may be data used for the operation of the memory device 110.

The memory device 110 may store a plurality of address maps. Each address map may indicate a mapping relationship between a logical address and a physical address. For example, the address map may include mapping information between the logical address and the physical address. The address map may correspond to an address group. For example, the address map may include the mapping information in a unit of the address group. An address group may be a group or a list including a plurality of logical addresses of files. In other words, the files or the plurality of logical addresses of the files may belong to the address group. The address map may include mapping information on the plurality of logical addresses and a plurality of physical addresses of the files belonging to the address group. Here, the logical address indicates a storage position of data or a file used in the host 200. The physical address indicates a storage position of data or the file inside the memory device 110. The plurality of address maps may be stored in the system data block of the memory device 110.

The memory controller 120 may control the operation of the memory device 110. When the request and the logical address are received from the host 200, the memory controller 120 may convert the logical address into a corresponding physical address and control the memory device 110 to perform the operation corresponding to the request to the storage position indicated by the physical address. For example, the request may be a write request, a read request, an erase request, and the like. An operation corresponding to the write request may be a program operation of storing data, an operation corresponding to the read request may be a read operation of outputting stored data, and an operation corresponding to the erase request may be an erase operation of erasing stored data. The memory controller 120 may load the address map stored in the memory device 110 to convert the logical address into the corresponding physical address.

The buffer memory 130 may store a command or a plurality of address maps used by the memory controller 120. In an embodiment, the buffer memory 130 may store data or output the stored data at a speed faster than that of the memory device 110.

According to an embodiment, the buffer memory 130 may be a dynamic RAM (DRAM) that may preserve stored data by performing a refreshment every predetermined time. In this case, the buffer memory 130 may store data in a power on state. In another embodiment, the buffer memory 130 may be a static random access memory (SRAM) in which stored data may be continuously preserved as long as power is supplied.

The host 200 may include a central processing unit, a host memory, and a communication interface. The central processing unit may execute an application program using data loaded into the host memory or may perform operation processing on the data loaded into the host memory. An application program, a file system, a device driver, and the like may be loaded into the host memory. The communication interface may provide a physical connection between the host 200 and the storage device 100.

The host 200 may allocate a partial area of the host memory as a host memory buffer HMB. That is, the host 200 may include the host memory buffer HMB. The host memory buffer HMB may store various data. For example, the host memory buffer HMB may store file attribute information. Here, the file attribute information is information indicating various attributes of a file. The file may indicate a unit of data in a specific file system. For example, the file system may be FAT16, FAT32, exFAT, NTFS, EXT2, EXT3, EXT4, HFS, HFS+, APFS, and the like. The storage device 100 may access data stored in the host memory buffer HMB.

The memory controller 120 according to an embodiment of the present disclosure may receive the file attribute information stored in the host memory buffer HMB of the host 200 from the host memory buffer HMB. The memory controller 120 may perform various operations using the file attribute information.

In an embodiment, when the memory controller 120 is in a power on state from a power off state, the memory controller 120 may determine a priority rank of each of the plurality of address maps based on the file attribute information received from the host 200. The memory controller 120 may sequentially load the plurality of address maps according to the priority rank. Accordingly, when the request of the host 200 is received while the plurality of address maps are loaded, an issue in which a delay occurs due to overhead may be solved.

According to an embodiment of the present disclosure, the memory controller 120, the storage device 100, and a method of operating the same for improving an operation speed may be provided. According to an embodiment, an operation speed of a booting process may be improved. According to an embodiment, the memory block may be efficiently managed in consideration of an attribute of data and a lifetime of the memory block. Hereinafter, embodiments of the present disclosure are described in more detail with reference to the accompanying drawings.

Figure 2:
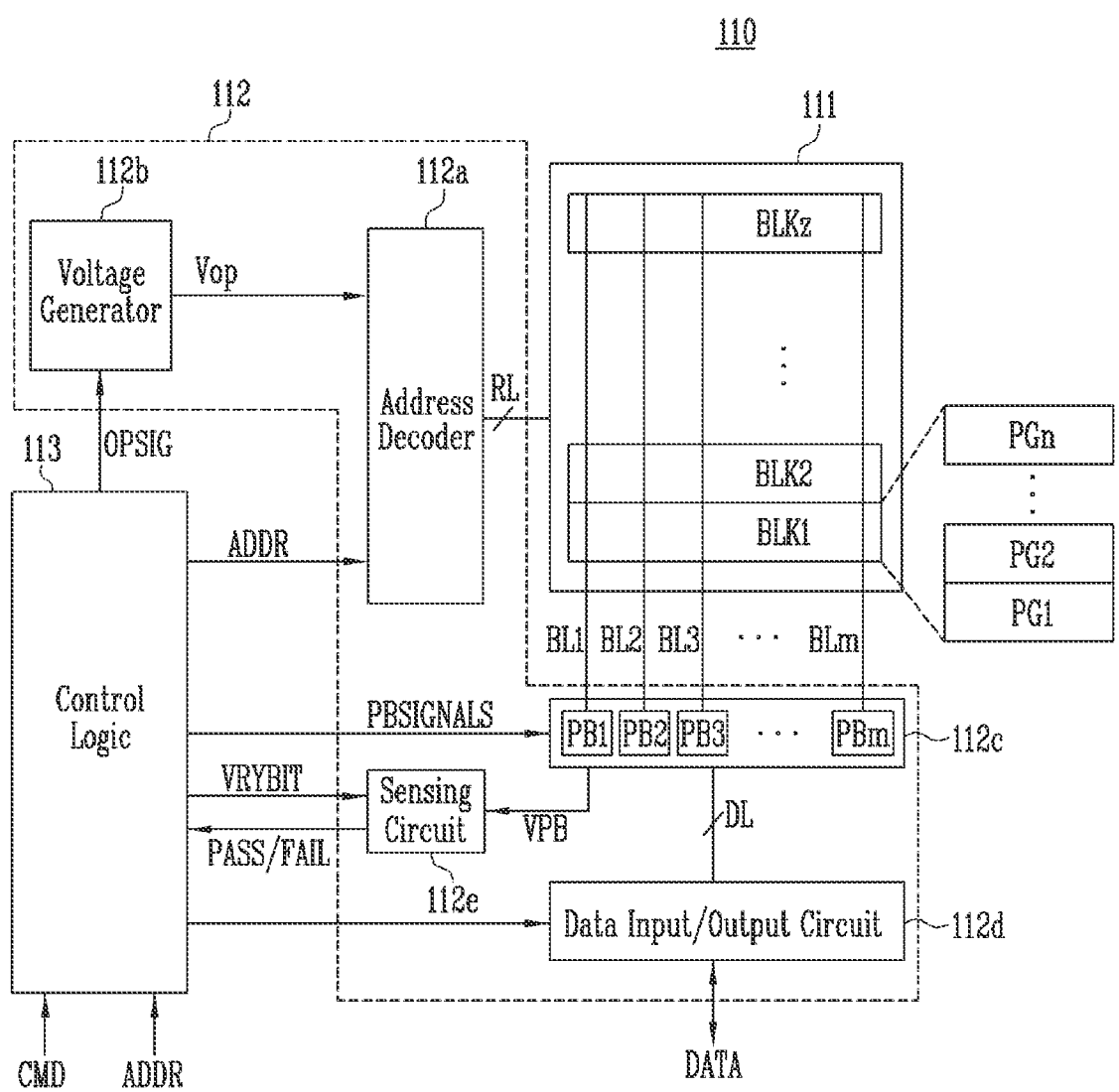
FIG. 2 is a diagram illustrating a memory device according to an embodiment of the present disclosure.

FIG. 2 is a diagram illustrating a memory device according to an embodiment of the present disclosure.

Referring to FIG. 2, the memory device 110 may include a memory cell array 111, a peripheral circuit 112, and a control logic 113.

The memory cell array 111 may include a plurality of memory blocks BLK1 to BLKz. Each of the memory blocks BLK1 to BLKz may be connected to a row line RL. Here, the row line RL may include a plurality of word lines. Each of pages PG1 to PGn may be connected to one word line. Each of memory blocks BLK1 to BLKz may be connected to a plurality of bit lines BL1 to BLm. Each of the pages PG1 to PGn may be connected to the plurality of bit lines BL1 to BLm.

Each of the memory blocks BLK1 to BLKz may include the plurality of pages PG1 to PGn. Each of the pages PG1 to PGn may include a plurality of memory cells. The memory cell may store data of a bit unit. For example, a threshold voltage of the memory cell may vary according to an amount of stored charge. The threshold voltage of the memory cell may indicate a bit value of data stored in the memory cell. Here, each of the pages PG1 to PGn may include memory cells of a unit in which the program operation of storing data or the read operation of reading the stored data is performed. Each of the memory blocks BLK1 to BLKz may include memory cells of a unit in which the erase operation of erasing data is performed.

Each of the memory blocks BLK1 to BLKz may include a plurality of memory cells. The plurality of memory cells may be disposed in a two-dimensional structure or a three-dimensional structure. Here, the memory cell may be a semiconductor memory device. One memory cell may be connected to one word line and one bit line. The threshold voltage of the memory cell may belong to one program state among a plurality of program states. Here, the number of program states may vary according to a data storage method. For example, one memory cell may store data according to various data storage methods such as a single level cell (SLC) that stores 1-bit data, a multi-level cell (MLC) that stores 2-bit data, a triple level cell (TLC) that stores 3-bit data, and a quad level cell (QLC) that stores 4-bit data.

The peripheral circuit 112 may operate in response to control of the control logic 113. For example, the peripheral circuit 112 may drive the memory cell array 111 to perform the program operation, the read operation, or the erase operation.

The peripheral circuit 112 may include an address decoder 112a, a voltage generator 112b, a read and write circuit 112c, a data input/output circuit 112d, and a sensing circuit 112e.

The address decoder 112a may be connected to the memory cell array 111 through the row line RL. For example, the row line RL may include a drain select line, a plurality of word lines, a source select line, and a source line. For example, the address decoder 112a may include components such as a row decoder, a column decoder, and an address buffer.

The address decoder 112a may operate in response to the control of the control logic 113. For example, the address decoder 112a may receive an address ADDR from the control logic 113. The address decoder 112a may decode a block address or a page address included in the received address ADDR. Here, the page address may indicate a row address. The address decoder 112a may apply an operation voltage Vop provided from the voltage generator 112b to a selected memory block determined by the block address among the memory blocks BLK1 to BLKz. The address decoder 112a may apply the operation voltage Vop provided from the voltage generator 112b to a selected page determined by the page address among pages included in the selected memory block determined by the block address. Here, the operation voltage Vop may include at least one of a program voltage, a verify voltage, a program pass voltage, a verify pass voltage, a read voltage, a read pass voltage, first and second erase voltages, and the like.

The voltage generator 112b may generate various types of operation voltages Vop using external power supplied to the memory device 110. For example, the program voltage, the verify voltage, the program pass voltage, the verify pass voltage, the read voltage, the read pass voltage, the first and second erase voltages, and the like may be generated using the external power supplied to the memory device 110.

The voltage generator 112b may operate in response to the control of the control logic 113. For example, when an operation signal OPSIG is received from the control logic 113, the voltage generator 112b may transmit the operation voltage Vop corresponding to the operation signal OPSIG to the address decoder 112a.

The read and write circuit 112c may include a plurality of page buffers PB1 to PBm. Each of the plurality of page buffers PB1 to PBm may be connected to the memory cell array 111 through a corresponding bit line among the plurality of bit lines BL1 to BLm. For example, each of the plurality of page buffers PB1 to PBm may be commonly connected to memory cells indicating a specific column among the memory cells included in each of the plurality of memory blocks BLK1 to BLKz through one bit line. Each of the plurality of page buffers PB1 to PBm may temporarily store data DATA. To this end, each of the plurality of page buffers PB1 to PBm may be implemented with various memory devices such as a latch circuit.

The read and write circuit 112c may operate in response to the control of the control logic 113. For example, when a buffer control signal PBSIGNALS is received from the control logic 113, the read and write circuit 112c may apply a voltage corresponding to the data DATA to the memory cell array 111 through the plurality of bit lines BL1 to BLm, or read the data DATA stored in the memory cell array 111 through the plurality of bit lines BL1 to BLm.

The data input/output circuit 112d may be connected to the read and write circuit 112c through a data line DL. The data input/output circuit 112d may include a plurality of input/output buffers receiving the input data DATA. The data input/output circuit 112d may operate in response to a control signal of the control logic 113. For example, when the control signal of the control logic 113 is received, the data input/output circuit 112d may transmit the data DATA to the read and write circuit 112c through the data line DL or output the data DATA to the memory controller 120 through a channel.

The sensing circuit 112e may generate a reference voltage in response to an allowable bit signal VRYBIT received from the control logic 113. The sensing circuit 112e may output a pass signal PASS or a fail signal FAIL to the control logic 113 according to a result of comparing a sensing voltage VPB received from the read and write circuit 112c with a reference voltage. Here, the pass signal PASS may indicate that a program pulse operation or the read operation is passed. The fail signal FAIL may indicate that the program pulse operation or the read operation is failed.

The control logic 113 may control an overall operation of the memory device 110. The control logic 113 may control the peripheral circuit 112 to perform the program operation, the read operation, or the erase operation according to a command CMD and an address ADDR received from the memory controller 120. Here, the command CMD may be a program command, a read command, or an erase command. To this end, the control logic 113 may be connected to the peripheral circuit 112. For example, the control logic 113 may be connected to the address decoder 112a, the voltage generator 112b, the read and write circuit 112c, the data input/output circuit 112d, and the sensing circuit 112e.

Referring back to FIG. 1, the memory controller 120 may include at least one of a processor 121, a host interface (I/F) 122, a memory interface (I/F) 123, and a buffer manager 124.

The processor 121 may perform a function of a flash translation layer (FTL). The processor 121 may convert the logical address provided by the host 200 into the physical address through the address map. The processor 121 may execute firmware to control an operation of the memory controller 120. For example, the processor 121 may control an overall operation of the memory controller 120 and execute the firmware for performing a logical operation.

The host interface 122 may communicate with the host 200. To this end, the host interface 122 may be connected to the host 200. For example, the host interface 122 may be connected to the host 200 through a channel, and may transmit and receive a signal through the channel.

When the host interface 122 is in a power on state from a power off state, the host interface 122 may receive the file attribute information for each of the files included in the plurality of address groups from the host 200. For example, the host interface 122 may receive the file attribute information from the host memory buffer HMB of the host 200.

The processor 121 may determine a priority rank of the plurality of address maps corresponding to the plurality of address groups based on the file attribute information. The processor 121 may control the memory interface 123 to sequentially load the plurality of address maps from the memory device 110 according to the priority rank.

The memory interface 123 may communicate with the memory device 110. To this end, the memory interface 123 may be connected to the memory device 110. For example, the memory interface 123 may be connected to the memory device 110 through a channel, and may transmit and receive a signal through the channel.

The buffer manager 124 may communicate with the buffer memory 130 to manage the buffer memory 130. The buffer manager 124 may temporarily store data in the buffer memory 130, output the data stored in the buffer memory 130, or erase the data stored in the buffer memory 130.

The buffer manager 124 may communicate with the processor 121, the host interface 122, and the memory interface 123. The buffer manager 124 may store data received from the processor 121, the host interface 122, or the memory interface 123 in the buffer memory 130. The buffer manager 124 may transmit the data received from the buffer memory 130 to the processor 121, the host interface 122, or the memory interface 123.

The buffer manager 124 may store the address map loaded from the memory device 110 through the memory interface 123 in the buffer memory 130. The buffer manager 124 may transmit the address map stored in the buffer memory 130 to the processor 121 when the processor 121 performs the function of the FTL.

FIG. 3 is a diagram illustrating a first memory block according to an embodiment of the present disclosure.

Referring to FIG. 3, the first memory block BLK1 according to an embodiment of the present disclosure may include a plurality of pages PG1 to PG9. A description of the first memory block BLK1 described below may be applied to each of the plurality of memory blocks BLK.

Each of the pages PG1 to PG9 may have one of a program state and an erase state. The program state may indicate a page in which data is stored, and the erase state may indicate a page in which data may be stored. The data may be one of valid data and invalid data. For example, the valid data may be data in which an address map for corresponding data is preserved, and the invalid data may be data in which an address map for corresponding data is lost.

The first memory block BLK1 may store at least one or more files F1 to F3. The files F1 to F3 may include data stored in one or more pages. For example, a first file F1 may include data stored in first page PG1 to third page PG3. In this case, logical addresses allocated to the first file F1 may correspond to physical addresses indicating the first page PG1 to the third page PG3.

Figure 4:
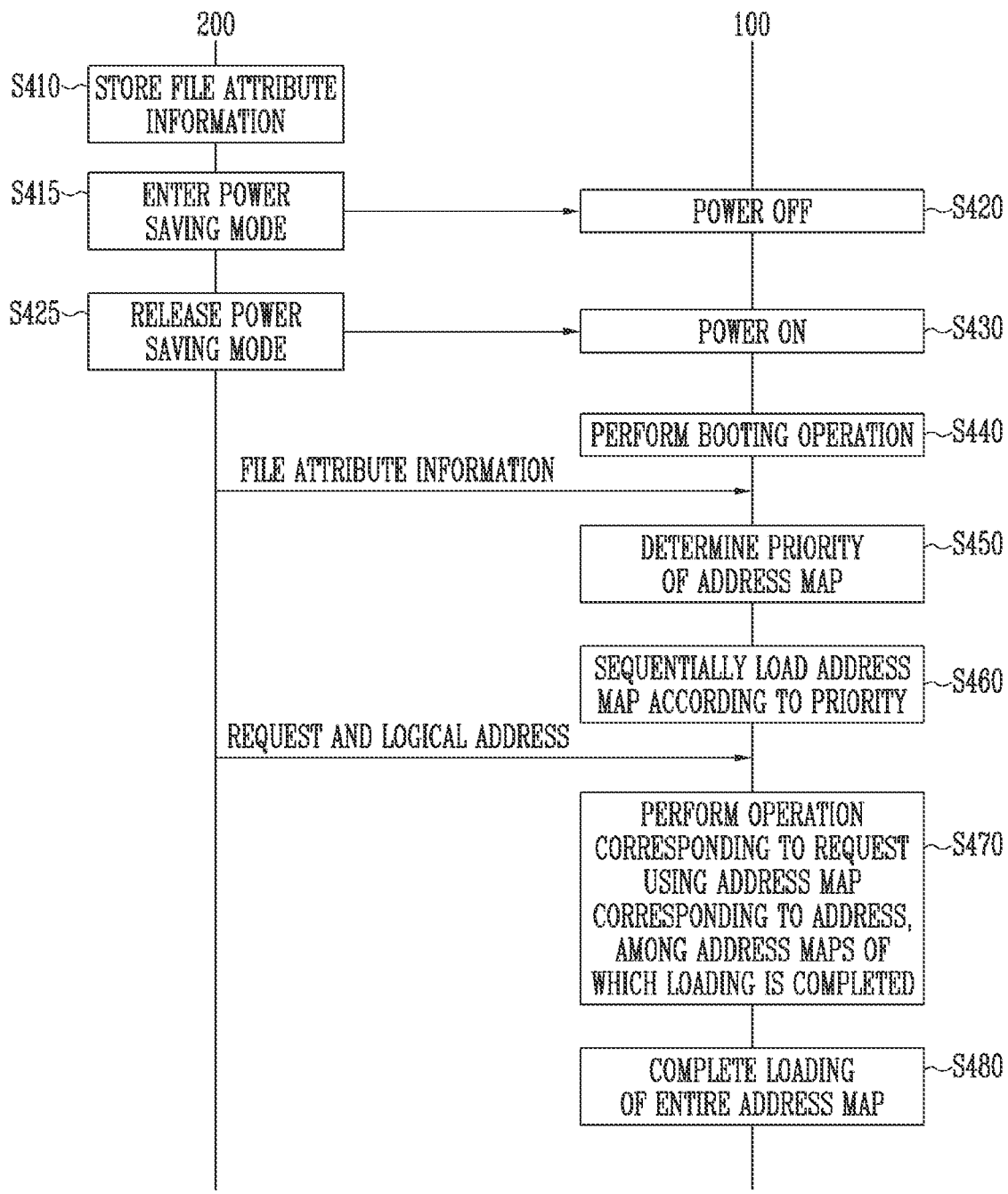
FIG. 4 is a diagram illustrating a method of operating a storage device according to an embodiment of the present disclosure.

FIG. 4 is a diagram illustrating a method of operating a storage device according to an embodiment of the present disclosure.

Referring to FIG. 4, the host 200 may store the file attribute information of each of the files included in the plurality of address groups in the host memory buffer HMB (S410). Here, the file attribute information is information indicating the attribute of the file. For example, the file attribute information may include at least one of an access frequency of the file, a recent access time of the file, a file creation time, and a file modification time. The file is a unit of data stored in the memory device 110 inside the storage device 100.

The host 200 may control the storage device 100 to enter a power saving mode when a first event occurs (S415). For example, the first event may be a case in which a user command instructing to enter the power saving mode is received, a case in which the user command is not received during a predetermined time or more, and the like. For example, the power saving mode may be a runtime D3 (RTD3) state in which power supplied to the storage device 100 is cut off.

As the storage device 100 enters the power saving mode, power of the storage device 100 may be turned off (S420). In this case, the storage device 100 may be in a power off state in which the supplied power is cut off. In this case, data stored in the buffer memory 130 may be lost.

Thereafter, the host 200 may control the storage device 100 to release the power saving mode when a second event occurs (S425). For example, the second event may be a case in which the user command is received through an input device (for example, a button, a mouse, a keyboard, and the like). For example, the release of the power saving mode may be a restart state of the RTD3 in which the power is supplied to the storage device 100.

As the power saving mode is released, the power of the storage device 100 may be turned on (S430). In this case, the power may be supplied to the storage device 100, and thus the storage device 100 may be changed from the power off state to a power on state. In addition, the storage device 100 may perform a booting operation (S440). For example, the booting operation may be an operation of preparing the storage device 100 to be in a state in which the storage device 100 may perform an operation.

When the storage device 100 is in the power on state, the storage device 100 may receive the file attribute information of each of the files included in the plurality of address groups from the host 200. Here, at least one logical address may be allocated to each file according to a size of data. Each file may be included in a logical address group according to the logical address allocated to the file.

The storage device 100 may determine the priority rank of the plurality of address maps corresponding to the plurality of address groups based on the file attribute information (S450). One address group may correspond to one address map. For example, an address group and an address map corresponding to each other may include the same logical addresses. Here, the priority rank may indicate an order of loading the address map.

In an embodiment, determining the priority rank (S450) may determine a priority rank weighted value through a weighted value calculation using an access frequency and a recent access time of each of the files included in the file attribute information, with respect to each of files included in a selected address group among the plurality of address groups. In addition, the priority rank of a selected address map corresponding to the selected address group may be determined by comparing priority scores between the selected address group and the remaining address groups. The priority score of an address group may be an average value of the priority weighted values for the files included in the address group.

The storage device 100 may sequentially load the plurality of address maps from the memory device 110 according to the priority rank (S460). As the storage device 100 sequentially loads the plurality of address maps from the memory device 110 according to the priority rank, loading of the entire address map may be completed (S480).

In an embodiment, as the storage device 100 sequentially loads the plurality of address maps from the memory device 110 according to the priority rank, in a state in which loading of some address maps among the plurality of address maps is completed, the storage device may receive a request for data and the logical address from the host 200. The request for the data (or the file) may be a data write request or a data read request.

In this case, the storage device 100 may identify a physical address corresponding to the received logical address and perform an operation corresponding to the request on a storage area corresponding to the physical address, by using an address map corresponding to an address group including the received logical address among the some address maps of which loading is complete (S470).

According to an embodiment of the present disclosure, after performing the booting operation, the storage device 100 may determine the priority rank based on the file attribute information received from the host 200, and sequentially load an address map having a high probability of the request of the host 200 according to the priority rank, thereby improving an operation speed of the storage device 100 and quickly responding to the request of the host 200 without delay.

FIG. 5 is a diagram illustrating file attribute information according to an embodiment of the present disclosure.

In an embodiment, referring to FIG. 5, file attribute information 510 of files F1 to F5 included in each of a plurality of address groups LBAG1 to LBAG2 may include at least one of address information, access information, and file time information.

The address information may include start logical addresses LBAa to LBAe and lengths L1 to L5. The start logical addresses LBAa to LBAe indicate a position where a logical addresses start among at least one logical address allocated to the corresponding files F1 to F5. The lengths L1 to L5 indicate a length of the logical address allocated to the corresponding files F1 to F5. The lengths L1 to L5 may be proportional to a size (or a capacity) of the corresponding files F1 to F5. When a plurality of logical addresses are allocated to each of the files F1 to F5, the plurality of logical addresses may be consecutive addresses.

For example, when a first start logical address LBAa of a first file F1 is a first logical address and a first length L1 of the first file F1 is 3, the storage device 100 or the host 200 may identify that the first logical address to a third logical address are allocated to the first file F1 through the first start logical address LBAa of the first file F1 and the first length L1 of the first file F1.

The access information may include access frequencies FA1 to FA5 and recent access times TA1 to TA5. The access frequencies FA1 to FA5 indicate the number of times the host 200 accesses (or reads) the corresponding files F1 to F5 stored in the storage device 100. The recent access times TA1 to TA5 indicate times when the host 200 most recently accesses (or reads) the corresponding files F1 to F5 stored in the storage device 100.

The file time information may include file creation times TG1 to TG5 and file modification times TE1 to TE5. The file creation times TG1 to TG5 indicate times when the corresponding files F1 to F5 are initially stored in the storage device 100. The file modification times TE1 to TE5 indicate times when the corresponding files F1 to F5 are updated and stored in the storage device 100.

The file attribute information 510 may include information on the address groups LBAG1 to LBAG2. Each of the files F1 to F5 may be included in one of the address groups LBAG1 to LBAG2 according to a logical address to which each of the files F1 to F5 is allocated. That is, each of the address groups LBAG1 to LBAG2 may include at least one file. The address groups LBAG1 to LBAG2 may correspond to an address map. For example, the address groups LBAG1 to LBAG2 and the address map corresponding to each other may have a relationship including the same logical addresses. For example, the first to fourth files F1 to F4 may be belonging to the first address group LBAG1. A first address map corresponding to the first address group LBAG1 may include address mapping information of each of the first to fourth files F1 to F4. The address mapping information may be mapping information between a logical address and a physical address.

The processor 121 of the memory controller 120 according to an embodiment may determine a priority rank for each of the address groups LBAG1 to LBAG2 based on the recent access time and the access frequency included in the file attribute information. Specific contents of the priority rank are described with reference to FIGS. 6 and 7.

FIG. 6 is a diagram illustrating a method of determining a priority score according to an embodiment of the present disclosure.

Referring to FIG. 6, the processor 121 according to an embodiment may determine a priority weighted value through a weighted value calculation using a difference value between a current time and a recent access time, and an access frequency with respect to each of files included in a selected address group among a plurality of address groups. For example, the selected address group is selected as a first address group LBAG1 including first to fourth files F1 to F4 as shown in a table 610 of FIG. 6.

In an embodiment, as shown in a first equation 620, the weighted value calculation may be a calculation of adding a value obtained by multiplying the access frequency by a first constant m1 and a value obtained by multiplying a difference value between the current time and the recent access time by a second constant m2. The priority weighted value may be obtained as a result of the weighted value calculation. Each of the first constant m1 and the second constant m2 may be a preset value. For example, each of the first constant m1 and the second constant m2 may have a value greater than 0 and less than 1.

In this case, the processor 121 may obtain a first priority weighted value PV1 for the first file F1 through a weighted value calculation using a difference value between the current time and a recent access time TA1, and an access frequency FA1. In the same method, the processor 121 may obtain second to fourth priority weighted values PV2 to PV4.

In an embodiment, as shown in a second equation 630, the processor 121 may determine an average value of the priority weighted values PV1 to PV4 as a first priority score PS1 of the first address group LBAG1. In the same method, the processor 121 may determine a priority score for each of other address groups. In addition, the processor 121 may determine the priority rank of the selected address map corresponding to the selected address group LBAG1 by comparing the priority score PS1 of the first address group LBAG1 with the priority score of the other address groups.

Figure 7:
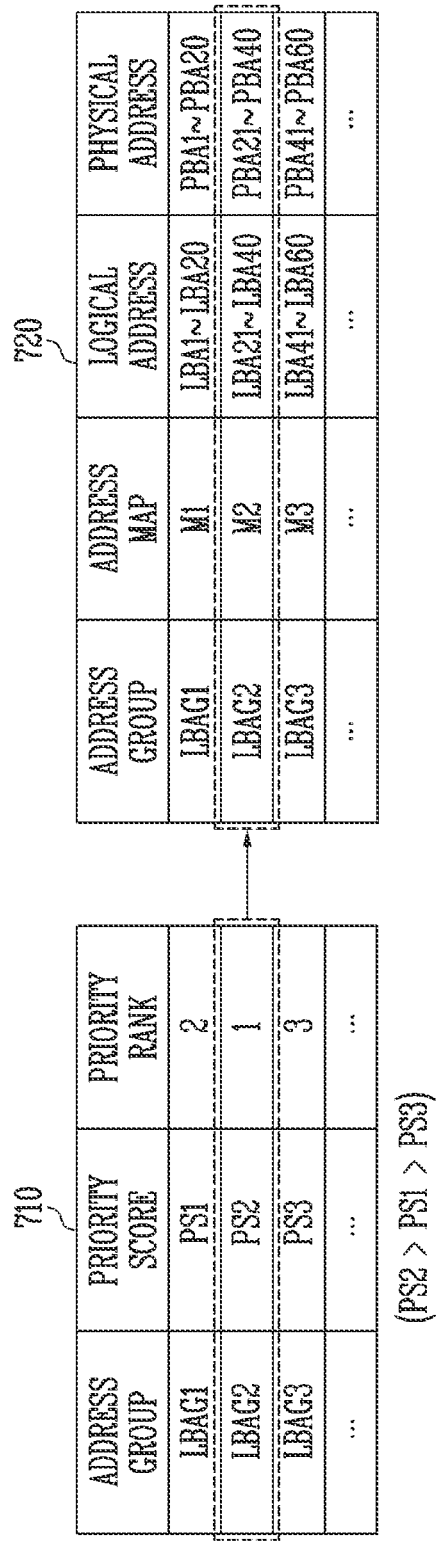
FIG. 7 is a diagram illustrating a priority rank according to an embodiment of the present disclosure.

FIG. 7 is a diagram illustrating a priority rank according to an embodiment of the present disclosure.

Referring to FIG. 7, the processor 121 according to an embodiment may compare sizes of priority scores PS1 to PS3 of a plurality of address groups LBAG1 to LBAG3, to determine a priority rank of each of the plurality of address groups LBAG1 to LBAG3.

For example, as shown in a first table 710 of FIG. 7, when sizes are decreased in an order of a second priority score PS2 of a second address group LBAG2, a first priority score PS1 of a first address group LBAG1, and a third priority score PS3 of a third address group LBAG3, the processor 121 may determine a value of the priority rank in an order of the second address group LBAG2, the first address group LBAG1, and the third address group LBAG3. Here, as the value of the priority rank decreases, an order of loading the address map may be earlier. That is, as the priority score increases, the order of loading the address map may be earlier.

As shown in a second table 720 of FIG. 7, the plurality of address groups LBAG1 to LBAG3 may correspond to a plurality of address maps M1 to M3. The processor 121 may sequentially load the plurality of address maps M1 to M3 according to the priority rank.

For example, the processor 121 may control the memory device 110 to first load a second address map M2 corresponding to the second address group LBAG2 having the smallest priority rank among the plurality of address groups LBAG1 to LBAG3. The processor 121 may control the memory device 100 to load a first address map M1 corresponding to the first address group LBAG1 having the next smallest priority rank among the plurality of address groups LBAG1 to LBAG3. In the same method, the processor 121 may sequentially load the plurality of address maps M1 to M3 according to the priority rank.

Each of the plurality of address maps M1 to M3 may include the mapping relationship between the logical address and the physical address. For example, the first address map M1 includes logical addresses LBA1 to LBA20 included in the first address group LBAG1 and physical addresses PBA1 to PBA20 corresponding to the logical addresses LBA1 to LBA20, respectively.

FIG. 8 is a diagram illustrating a method of determining a hot/cold weighted value according to an embodiment of the present disclosure.

Referring to FIG. 8, the processor 121 according to an embodiment may determine hot/cold weighted values HCV1 to HCV4 for each of the plurality of files F1 to F4 based on the file creation time and the file modification time for each of the plurality of files F1 to F4.

In a specific embodiment, as shown in a table 810 of FIG. 8, the processor 121 may determine the hot/cold weighted value HCV1 of the first file F1 through a weighted value calculation using a first difference value between the file modification time TE1 and the file creation time TG1 of the first file F1, and a second difference value between the current time and the file modification time TE1. Through such a method, the processor 121 may determine the hot/cold weighted values HCV2 to HCV4 of each of the second to fourth files F2 to F4.

For example, as shown in a third equation 820, the weighted value calculation may be a calculation of adding a value obtained by multiplying the first difference value between the file modification time and the file creation time by a first constant h1 and a value obtained by multiplying the second difference value between the current time and the file modification time by a second constant h2. The hot/cold weighted value may be obtained as a result of the weighted value calculation. Each of the first constant h1 and the second constant h2 may be a preset value. For example, each of the first constant h1 and the second constant h2 may be a value greater than 0 and less than 1.

FIG. 9 is a diagram illustrating a method of determining a hot/cold rank according to an embodiment of the present disclosure.

Referring to FIG. 9, the processor 121 according to an embodiment may determine the hot/cold rank of the plurality of files F1 to F4 by comparing sizes of the hot/cold weighted values HCV1 to HCV4 of the plurality of files F1 to F4.

For example, as shown in a table 910 of FIG. 9, when sizes decrease in an order of a second hot/cold weighted value HCV2, a fourth hot/cold weighted value HCV4, a third hot/cold weighted value HCV3, and a first hot/cold weighted value HCV1, the processor 121 may determine a value of the hot/cold rank in an order of a second file F2, a fourth file F4, a third file F3, and a first file F1.

Here, as the value of the hot/cold rank decreases (or the value of the hot/cold weighted value increases), a type of a corresponding file may be cold data. The cold data indicates data that is requested by the host 200 a relatively small number of times. As the value of the hot/cold rank increases (or the value of the hot/cold weight decreases), the type of a corresponding file may be hot data. The hot data indicates data that is requested by the host 200 a relatively large number of times.

In a case of the cold data, a garbage collection operation may be performed. Hereinafter, a method of performing garbage collection on memory blocks storing the files F1 to F4 such as the table 910 of FIG. 9 is specifically described with reference to FIGS. 10 and 11.

Figure 10:
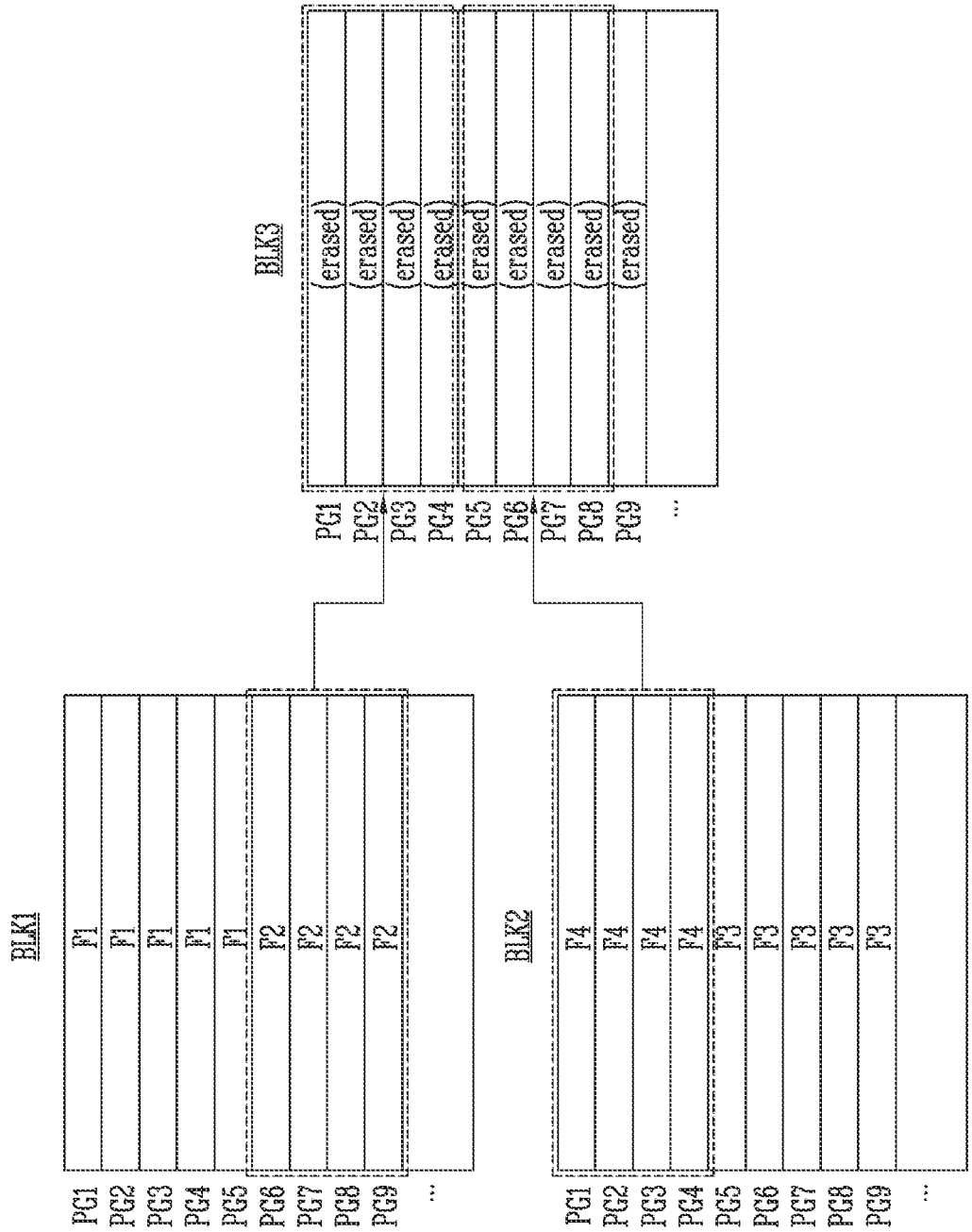
FIGS. 10 and 11 are diagrams illustrating a garbage collection operation according to an embodiment of the present disclosure.
Figure 11:
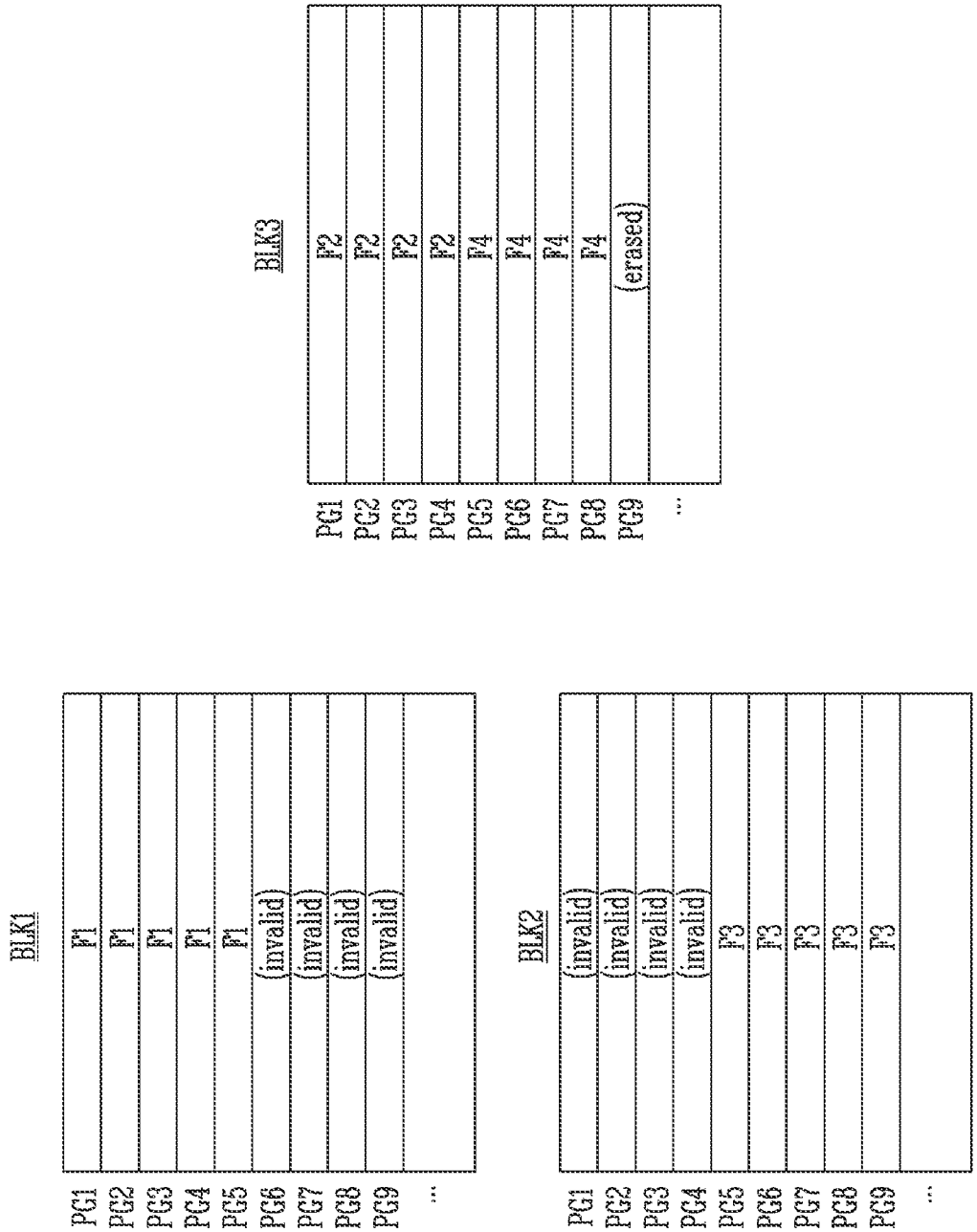

FIGS. 10 and 11 are diagrams illustrating a garbage collection operation according to an embodiment of the present disclosure.

Referring to FIG. 10, the memory device 110 may include first to third memory blocks BLK1 to BLK3. Each of the first to third memory blocks BLK1 to BLK3 may include a plurality of pages PG1 to PG9.

First to fifth pages PG1 to PG5 of the first memory block BLK1 may store the first file F1. Sixth to ninth pages PG6 to PG9 of the first memory block BLK1 may store the second file F2. First to fourth pages PG1 to PG4 of the second memory block BLK2 may store the fourth file F4. Fifth to ninth pages PG5 to PG9 of the second memory block BLK2 may store the third file F3. The third memory block BLK3 may be a free block. In the free block, all pages PG1 to PG9 included in the memory block may be in an erased state.

In an embodiment, an erase count value of the third memory block BLK3 may be equal to or greater than a reference value. The erase count value indicates the number of times the erase operation is performed on a corresponding memory block. As the erase count value increases, a remaining lifespan of a corresponding memory block may decrease. The reference value may be a set value.

The processor 121 may select files among the plurality of files F1 to F4 in a descending order of the hot/cold weighted value. For example, as shown in the table 910 of FIG. 9, the processor 121 may select the second file F2 and the fourth file F4 according to the descending order of the hot/cold weighted value.

In addition, the processor 121 may control the memory device 110 to store the selected files F2 and F4 in the third memory block BLK3 among the plurality of memory blocks BLK1 to BLK3 included in the memory device 110. For example, the processor 121 may control the memory interface 123 to transmit a command instructing to store the selected files F2 and F4 in the third memory block BLK3 to the memory device 110. The memory device 110 may perform the program operation of storing the selected files F2 and F4 in the third memory block BLK3 according to the received command.

In this case, as shown in FIGS. 10 and 11, the second file F2 of the first memory block BLK1 and the fourth file F4 of the second memory block BLK2 may be stored in the third memory block BLK3, and the second file F2 of the first memory block BLK1 and the fourth file F4 of the second memory block BLK2 may be processed as invalid data.

According to an embodiment of the present disclosure as described above, the memory blocks included in the memory device 110 may be efficiently managed using the file attribute information of the host 200.

Figure 12:
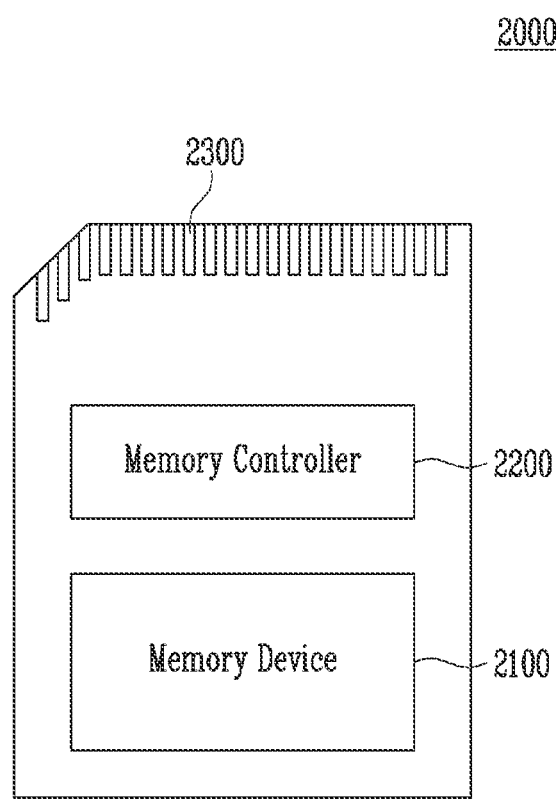
FIG. 12 is a block diagram illustrating a memory card to which a storage device is applied according to an embodiment of the present disclosure.

FIG. 12 is a block diagram illustrating a memory card 2000 to which a storage device is applied according to an embodiment of the present disclosure.

Referring to FIG. 12, the memory card 2000 may include a memory device 2100, a memory controller 2200, and a connector 2300.

The memory device 2100 may perform a program operation of storing data, a read operation of reading data, or an erase operation of erasing data. The memory device 2100 may be implemented with various nonvolatile semiconductor memory devices. The description of the memory device 110 described with reference to FIG. 1 and the like may be identically applied to the memory device 2100.

The memory controller 2200 may communicate with an external device through the connector 2300. The memory controller 2200 may communicate with an external device (for example, a host) according to a specific communication standard. For example, the memory controller 2200 may transmit data, a command, or the like through communication between the memory device 2100 and the host 200. The memory controller 2200 may control the memory device 2100. The memory controller 2200 may control the memory device 2100 to perform the program operation, the read operation, or the erase operation. The description of the memory controller 120 described with reference to FIG. 1 and the like may be identically applied to the memory controller 2200.

The memory device 2100 and the memory controller 2200 may be integrated into one semiconductor device to configure a memory card. For example, the memory device 2100 and the memory controller 2200 may be integrated into one semiconductor device, and may be manufactured in a type of a memory card such as a personal computer memory card international association (PCMCIA), a compact flash (CF) card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 13:
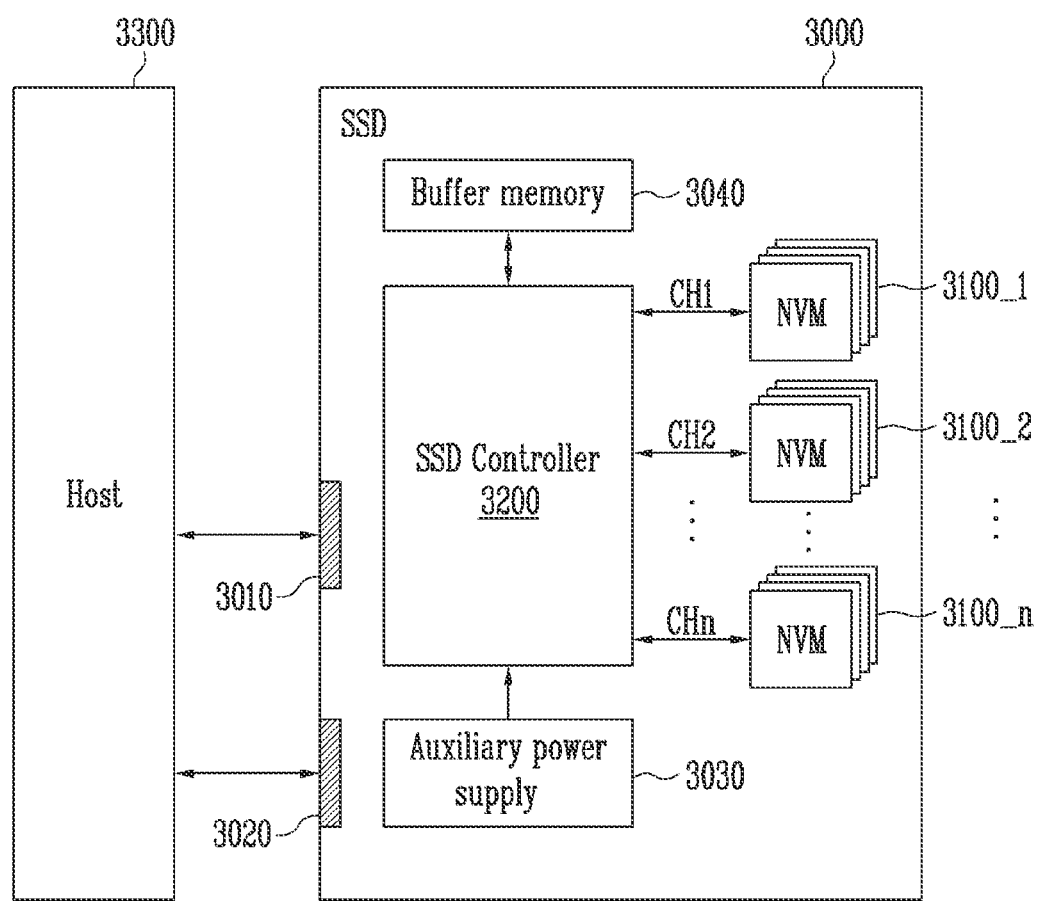
FIG. 13 is a block diagram illustrating a solid state drive (SSD) to which a storage device is applied according to an embodiment of the present disclosure.

FIG. 13 is a block diagram illustrating a solid state drive (SSD) 3000 to which a storage device is applied according to an embodiment of the present disclosure.

Referring to FIG. 13, the SSD 3000 may include a plurality of nonvolatile memory devices 3100_1 to 3100_n, an SSD controller 3200, a signal connector 3010, a power connector 3020, an auxiliary power supply 3030, and a buffer memory 3040.

The SSD 3000 may communicate with a host 3300 through the signal connector 3010. The signal connector 3010 may be implemented in a form of an interface according to various communication methods. For example, the signal connector 3010 may be one of interfaces according to various communication methods, such as a serial ATA (SATA) interface, a mini-SATA (mSATA) interface, a PCI express (PCIe) interface, and an M.2 interface.

A plurality of first nonvolatile memory devices 3100_1 may be connected to the SSD controller 3200 through a first channel CH1, a plurality of second nonvolatile memory devices 3100_2 may be connected to the SSD controller 3200 through a second channel CH2, and a plurality of n-th nonvolatile memory devices 3100_n may be connected to the SSD controller 3200 through an n-th channel CHn. Accordingly, the SSD controller 3200 may perform communication in parallel with the nonvolatile memory devices connected through channels independent of each other.

Furthermore, the description of the memory device 110 described with reference to FIG. 1 may be identically applied to each of the plurality of nonvolatile memory devices 3100_1 to 3100_n. The description of the memory controller 120 described with reference to FIG. 1 may be identically applied to the SSD controller 3200. Hereinafter, a repetitive description is omitted.

The SSD 3000 may receive external power from the host 3300 through the power connector 3020. The auxiliary power supply 3030 may be connected to the host 3300 through the power connector 3020. The auxiliary power supply 3030 may receive power from the host 3300 and charge the power. The auxiliary power supply 3030 may provide power to the SSD 3000 when power supply from the host 3300 is not smooth. The auxiliary power supply 3030 may be positioned inside the SSD 3000 or outside the SSD 3000. For example, the auxiliary power supply 3030 may be positioned on a main board and may provide auxiliary power to the SSD 3000.

The buffer memory 3040 may temporarily store data. For example, the buffer memory 3040 may temporarily store data received from the host 3300 or data received from the plurality of nonvolatile memory devices 3100_1 to 3100_n, or temporarily store meta data (for example, a mapping table) of the nonvolatile memory devices 3100_1 to 3100_n. The buffer memory 3040 may include a volatile memory such as a DRAM or SRAM, or a nonvolatile memory device such as an EEPROM.

Various embodiments of the present invention have been illustrated and described. Although specific terminologies are used herein, they are used only in the descriptive sense. The present invention is not limited to or by any such term nor any of the above-described embodiments, as many variations are possible within the spirit and scope of the present invention. The present invention encompasses all such variations to the extent that they fall within the scope of the following claims. Furthermore, the embodiments may be combined to form additional embodiments.

What is claimed is:

1. A storage device comprising:
a memory device configured to store a plurality of address maps indicating a mapping relationship between a logical address and a physical address; and
a memory controller configured to, when the storage device is in a power on state from a power off state, determine a priority rank of each of the plurality of address maps based on file attribute information received from a host, and sequentially load the plurality of address maps according to the priority rank,
wherein the file attribute information includes at least one of an access frequency, and a recent access time of each of files included in a plurality of address groups corresponding to the plurality of address maps,
wherein the memory controller is configured to determine the priority rank by:
determining a priority weighted value through a weighted value calculation using the access frequency and a difference value between a current time and the recent access time with respect to each of the files included in a selected address group among the plurality of address groups, and
determining the priority rank of a selected address map corresponding to the selected address group based on the priority weighted value.

2. The storage device of claim 1, wherein the file attribute information includes at least one of the access frequency, the recent access time, a file creation time, and a file modification time of each of files included in the plurality of address groups corresponding to the plurality of address maps.

3. The storage device of claim 2, wherein the memory controller is configured to determine the priority rank based on the access frequency and the recent access time.

4. The storage device of claim 3, wherein the memory controller is configured to determine the priority rank by:
determining, as a priority score of the selected address group, an average value of the priority weighted values for the files included in the selected address group, and
determining the priority rank of the selected address map corresponding to the selected address group by comparing the priority scores of the selected address group and remaining address groups.

5. The storage device of claim 2,
wherein the memory device includes a plurality of memory blocks storing a plurality of files, and
wherein the memory controller is further configured to:
determine a hot/cold weighted value of each of the plurality of files based on the file creation time and the file modification time, and
control the memory device to store files, which are selected in a descending order of the hot/cold weighted values among the plurality of files, in a free block having an erase count value equal to or greater than a reference value among the plurality of memory blocks.

6. The storage device of claim 5, wherein the memory controller is configured to determine the hot/cold weighted value of each of the plurality of files through the weighted value calculation using a first difference value between the file modification time and the file creation time, and a second difference value between a current time and the file modification time.

7. The storage device of claim 1, wherein when a request for data and a logical address are received from the host in a state in which loading of address maps among the plurality of address maps is completed, the memory controller is further configured to:
identify a physical address corresponding to the received logical address, using an address map corresponding to an address group including the received logical address among the address maps, and
control the memory device to perform an operation corresponding to the request on a storage area corresponding to the physical address.

8. The storage device of claim 1, further comprising a buffer memory configured to store data in the power on state,
wherein the memory controller is further configured to control the memory device to sequentially store the plurality of address maps in the buffer memory according to the priority rank.

9. The storage device of claim 1, wherein the memory controller is further configured to receive the file attribute information stored in a host memory buffer included in the host.

10. A memory controller comprising:
a host interface configured to receive, from a host, file attribute information of each of files included in a plurality of address groups when a storage device is in a power on state from a power off state;

a memory interface configured to communicate with a memory device that stores a plurality of address maps indicating a mapping relationship between a logical address and a physical address; and a processor configured to determine a priority rank of each of the plurality of address maps corresponding to the plurality of address groups based on the file attribute information, and control the memory interface to sequentially load the plurality of address maps from the memory device according to the priority rank, wherein the file attribute information includes at least one of an access frequency, and a recent access time of each of files included in a plurality of address groups corresponding to the plurality of address maps, wherein the processor is further configured to determine the priority rank by:

determining a priority weighted value through a weighted value calculation using the access frequency and a difference value between a current time and the recent access time with respect to each of the files included in a selected address group among the plurality of address groups, and determining the priority rank of a selected address map corresponding to the selected address group based on the priority weighted value.

11. The memory controller of claim 10, wherein the file attribute information includes at least one of the access frequency, the recent access time, a file creation time, and a file modification time of each of the files.

12. The memory controller of claim 11, wherein the processor is configured to:

determine, as a priority score of the selected address group, an average value of the priority weighted values for the files included in the selected address group.

13. The memory controller of claim 11, wherein the processor is configured to:

determine a hot/cold weighted value of each of a plurality of files stored in the memory device based on the file creation time and the file modification time, select files in a descending order of the hot/cold weighted values among the plurality of files, and control the memory interface to transmit, to the memory device, a command instructing to store the selected files in a free block having an erase count value equal to or greater than a reference value among a plurality of memory blocks included in the memory device.

14. The memory controller of claim 13, wherein the processor is configured to determine the hot/cold weighted value of each of the plurality of files through the weighted value calculation using a first difference value between the file modification time and the file creation time, and a second difference value between a current time and the file modification time.

15. The memory controller of claim 10, further comprising a buffer manager configured to store the plurality of address maps loaded from the memory device in a buffer memory.

16. A method of operating a storage device, the method comprising:

receiving, from a host when the storage device is in a power on state, file attribute information of each of files included in a plurality of address groups;

determining a priority rank of a plurality of address maps corresponding to the plurality of address groups based on the file attribute information; and sequentially loading the plurality of address maps from a memory device according to the priority rank, wherein the file attribute information includes at least one of an access frequency, and a recent access time of each of files included in a plurality of address groups corresponding to the plurality of address maps, wherein the determining the priority rank comprises determining a priority weighted value through a weighted value calculation using the access frequency and a difference value between a current time and the recent access time with respect to each of the files included in a selected address group among the plurality of address groups, and determining the priority rank of a selected address map corresponding to the selected address group based on the priority weighted value.

17. The method of claim 16, wherein the determining the priority rank comprises:

determining a priority rank of a selected address map corresponding to the selected address group by comparing priority scores of the selected address group and remaining address groups, the priority score being an average value of the priority rank weighted values for the files included in a corresponding address group.

18. The method of claim 16, wherein the sequential loading comprises:

receiving a request for data and a logical address from the host in a state in which loading of address maps among the plurality of address maps is completed;

identifying a physical address corresponding to the received logical address, using an address map corresponding to an address group including the received logical address among the address maps; and performing an operation corresponding to the request on a storage area corresponding to the physical address.

* * * * *